Nov. 13, 1934.  J. V. GIESLER  1,980,264
METHOD OF CORRUGATING TUBES
Filed Jan. 16, 1932   2 Sheets-Sheet 1
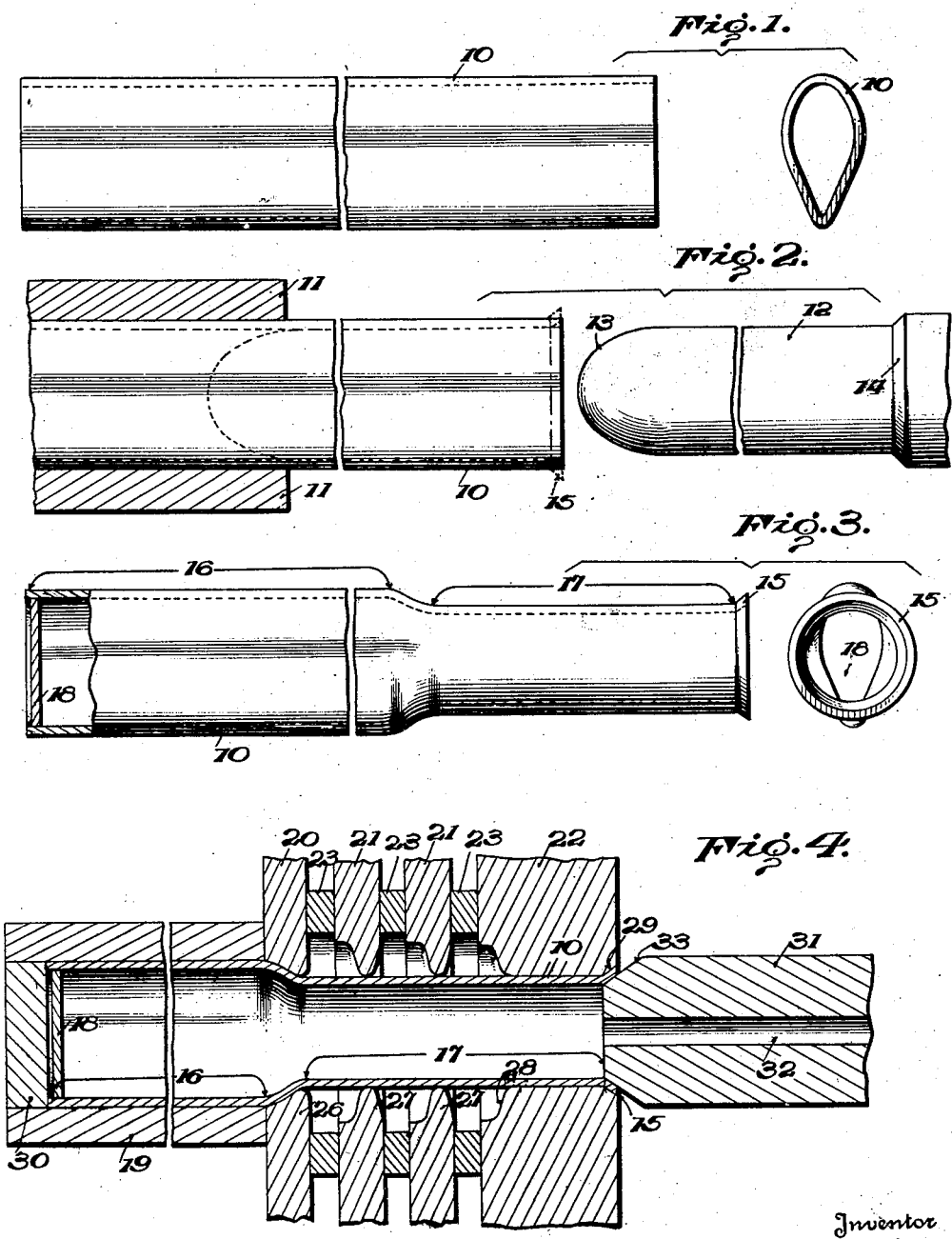

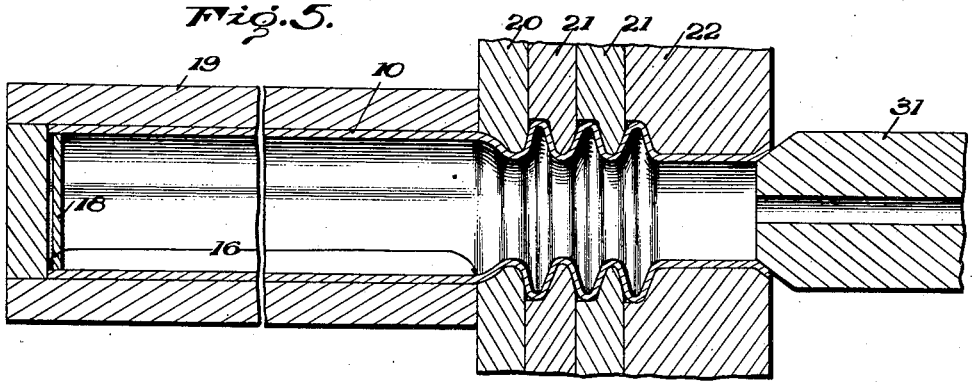
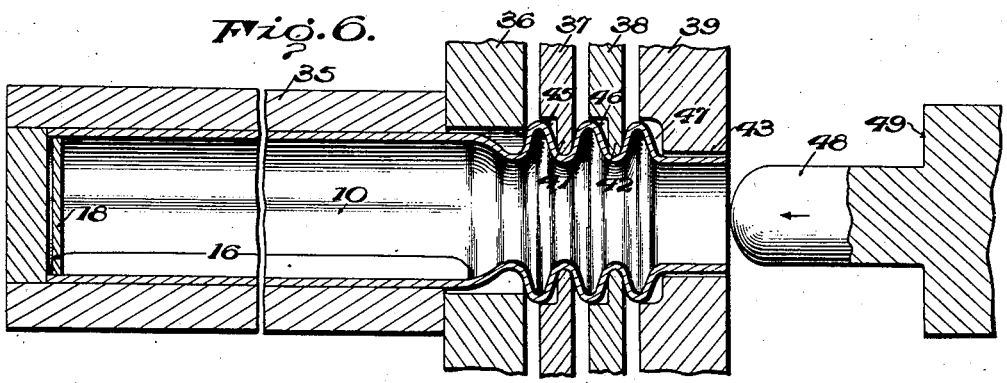
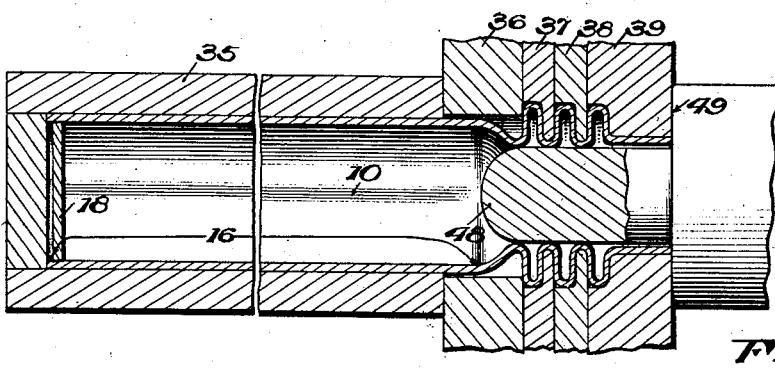
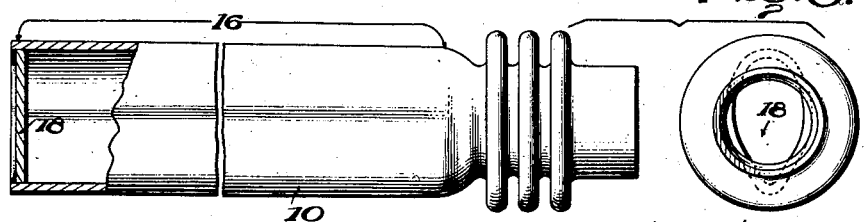

Patented Nov. 13, 1934

1,980,264

UNITED STATES PATENT OFFICE 1,980,264

METHOD OF CORRUGATING TUBES

Jean V. Giesler, Knoxville, Tenn., assignor to The Fulton Sylphon Company, Knoxville, Tenn., a corporation of Delaware Application January 16, 1932, Serial No. 587,049

1 Claim. (Cl. 153—73)

This invention relates to a method of corrugating tubes and more particularly to a method of forming corrugations on a portion of the tube adjacent one end.

It has been found, for example, that stream line tubes, with a portion of their surface adjacent one end formed with circular corrugations, may be advantageously used in heaters to improve the operation of such apparatus. The novel method of the present invention includes a series of operations by which the end portion of a stream line tube may be first formed into a hollow cylinder, then corrugated by the use of internal hydraulic pressure, preferably aided by an external collapsing pressure, and then the corrugations brought to their final size and shape, preferably by an axial collapsing pressure.

One of the objects of the present invention is to provide a novel method utilizing hydraulic pressure and axially movable die rings for forming a portion of a tube into corrugated formation.

Another object of the present invention is to provide a novel method of corrugating the end portion of a stream line tube without deforming the remainder of the tube.

Another object of the present invention is to provide a novel method of providing a portion of a tube with exterior corrugations compressed to the desired size without reducing the internal diameter of the tube.

Another object of the present invention is to provide a novel method of corrugating a portion of a tube which includes the corrugating of said portion with the use of internal hydraulic pressure and the compressing of the corrugations by a separate mechanical operation.

These and other objects will become more apparent from the following description and drawings in which the invention is shown as applied to a stream line tube together with apparatus for carrying out each of the operations in sequence. The apparatus is illustrated for the purpose of showing the various steps or operations of the method, but the method is not to be limited to such apparatus as other suitable apparatus could be used, and reference is therefore to be had to the appended claim for a definition of the limits of the invention.

In the drawings,

Fig. 1 is a side and end elevational view of the stream line tubing in its original form;

Fig. 2 is a side elevational view of the tube and apparatus prior to the formation of the cylindrical end portion;

Fig. 3 is a side and end elevational view of the tube shown in Fig. 1 after the cylindrical end portion has been formed by the apparatus shown in Fig. 2;

Fig. 4 is a side view in section of the tube and apparatus for forming the initial corrugations in the cylindrical end portion;

Fig. 5 is a side view in section similar to Fig. 4, but after the apparatus has completed its operation and formed the initial corrugations in the tube;

Fig. 6 is a side view in section of the tube and a third apparatus for collapsing the corrugations to their final shape;

Fig. 7 is a side view in section similar to Fig. 6 but after the apparatus has completed its operation; and Fig. 8 is a side and end elevational view of the tube shown in Fig. 1 with the corrugations in the cylindrical end portion in their final form.

The first operation in the method as illustrated consists in forming the end portion of a stream line tube such as that shown in Fig. 1 into a rounded or hollow cylindrical shape. To this end, the oval tube 10 is placed in a clamp 11, as shown in Fig. 2, to prevent deformation of that portion of the tube which is not to be corrugated. A cylindrical die 12 having a rounded nose 13 at the end and a tapered conical shoulder 14 spaced from its end, is forced into the open end of the tube 10. This insertion of the cylindrical die 12 deforms the contour of the tube to a cylindrical shape for such a portion of the tube immediately adjacent the open end as is required for the formation of the corrugations. A tapered conical flange 15 is also formed on the end of the cylindrical portion of the tube due to the engagement of the end of the tube by the tapered conical shoulder 14 of the die as it is forced into the tube. As shown in Fig. 3 the tube then has its original contour for a portion of its length 16, and a cylindrical shape for a portion of its length 17 adjacent the end, which last named portion terminates in the tapered flange 15. The section between the oval portion 16 and the cylindrical portion 17 is gradually tapered between the two contours. After this operation is completed, the tube is removed from the clamp 11 and a plug 18 is suitably fixed in the end of the tube opposite the flange 15 for making a pressure-tight enclosure.

In the next operation the cylindrical end portion of the tube is corrugated with the use of internal hydraulic pressure. To this end the tube is placed in an apparatus preferably in the form illustrated and consisting of a separable forming die having a portion 19 of the same contour as the original tube for engaging and preventing the deformation of the portion 16, and a portion including split annular die rings 20, 21 and 22 surrounding the cylindrical portion of the tube. These rings are spaced from each other by annular spacers 23, and the rings are provided on their inner peripheries with shaped surfaces 26, 27, and 28 such that when brought together they define a series of corrugations. The face of the ring 22 opposite from the face engaging the spacer 23 is provided with an annular conical recess 29 engaging the flange 15 on the end of the tube 10. The other end of the tube abuts against a plate 30 closing the end of the die 19 to prevent any bodily longitudinal movement of the tube 10 in the die.

After the tube is placed in the forming apparatus a plunger 31 of a hydraulic apparatus having a passage 32 and a conical nose 33 is forced into the open end of the tube in such manner that the flange 15 of the tube is compressed between the annular seat 29 on the plate 22 and the conical nose 33 of the plunger 31 to form a fluid-tight joint. Hydraulic pressure is then admitted to the interior of the tube 10, and the cylindrical portion surrounded by the rings 20, 21 and 22 is bulged outwardly by the hydraulic pressure to lock said die rings thereto, but any deformation of the remaining part of the tube 16 is prevented by the form 19 surrounding that portion of the tube. The spacers 23 are then removed and the plunger 31 suitably forced to the left as shown in the drawings, to cause an axial movement of the plates 20, 21 and 22 into engagement with each other, while corrugations are formed by the internal pressure and the axially collapsing pressure exerted by the plunger 31, or if preferred the corrugating action can be effected only by the hydraulic pressure and the plunger 31 may be so moved as to merely maintain its pressure seal on the recess 29. As the tube 10 is prevented from longitudinal movement by the engagement with the plate 30 at one end the entire compression movement of the tube takes place within the corrugations themselves. The final form of the tube after the forming rings have been closed is clearly shown in Fig. 5.

After the operation illustrated in Figs. 4 and 5 the hydraulic pressure is released, the plunger 31 removed, the forming apparatus separated and the tube in its partially formed condition removed. The tube is then placed in a second forming apparatus consisting of a separable die having a portion 35 corresponding to the portion 19 of the apparatus shown in Fig. 4, and also of the same oval contour as the tube shown in Fig. 1, which surrounds the portion 16 of the tube. The second part of the die consists of a plurality of spaced plates 36, 37, 38 and 39 having internally curved projections 41 and 42 and recesses 45, 46 and 47, the construction being such that the plates when closed form a regular series of projections and recesses, but when spaced engage in the corrugations as they are formed in the apparatus of Figs. 4 and 5. After the tube with the partially formed corrugations is placed in this second forming apparatus with the projections extending into the recesses between the corrugations, a plunger is moved forward or toward the left as shown in the drawings, said plunger having a mandrel 48 of the same diameter as the internal diameter of the corrugations so that it will enter the open end of the tube and prevent any decrease in the diameter of the corrugations. The plunger is also provided with a shoulder 49 which as it moves forward engages the outside of the outer plate 39, after the mandrel 48 has been fully inserted, and moves this plate together with plates 38 and 37 toward each other until the plates are entirely closed, as shown in Fig. 7. This closing of the plates compresses the corrugations to their final shape while holding the external diameter of the corrugations constant.

The present invention also includes a proper annealing of the tube during the various operations of the method described. The number of times that it will be necessary to anneal the tube and yet produce a corrugated end portion of proper hardness and resiliency is dependent upon the initial temper of the tube and the thickness of the wall. Preferably the end of the tube to be corrugated is annealed before the rounding operation on stream line tubes, and again before the corrugations are formed in the tube, thus allowing the subsequent working of the tube to give the proper hardness and resiliency for the final product. It has been found that such annealing is satisfactory when forming corrugations in relatively thick walls, such as .020 of an inch in a tube of one-half inch diameter, but other procedures of annealing may be found necessary for a particular condition.

The tube, then in its final form as shown in Fig. 8, has the portion 16 of the same contour as the original tube with the portion 17 formed with cylindrical corrugations having an inside diameter equal to the diameter of the cylindrical portion of the tube shown in Fig. 3 and an outside diameter equal to the diameter of the recesses in the forming plates 37, 38 and 39.

It will be apparent from the above description that a novel method has been provided for forming corrugations in a portion of a tube without deforming the remainder of the tube and which is available for use with tubes of cylindrical and various other configurations as well as stream line tubes. It will further be apparent that the method provides for the formation of corrugations at the end portion of a tube by a series of simple operations requiring little time or skill on the part of the operator and requiring only simple and inexpensive apparatus.

It will be apparent to those skilled in the art that other apparatus may be used for carrying out the operations without departing from the spirit of the invention. For instance, the rounding of the end portion of the tube could be accomplished by rolling or any suitable operation and the operations could be carried out on other shapes of tubes than the one herein illustrated. Other shapes of forming rings could be substituted for those shown in the drawings, and in some cases the corrugations formed in their final shape without the use of the second set of forming rings. Further the plug could be fixed in the tube before any deformation takes place and the operations carried out on a turret machine without removing the tube after each operation. Reference is therefore to be had to the appended claim for a definition of the limits of the invention.

What is claimed is:

The method of corrugating the circular portion of a tube which is non-circular in cross section for a large portion of its length and circular in cross section adjacent one end thereof which includes the steps of surrounding the non-circular portion of the tube with a die of the same contour as the tube to prevent deformation thereof by interior pressure, surrounding the circular portion of the tube with spaced movable die rings shaped to form corrugations, subjecting the interior of the tube to hydrostatic pressure while exerting an axial pressure exteriorly on the tube and lengthwise of the same to form axially flexible corrugations in the circular portions of the tube by the combined action of said hydrostatic pressure and said axial pressure, introducing spaced axially movable die rings into the corrugations opening externally of the tube, inserting interiorly of the tube a cylindrical form having an external diameter substantially equal to the final internal diameter of the inwardly directed corrugations, and moving said die rings axially to compress said corrugations while guiding, centering and restricting said inwardly directed corrugations.

JEAN V. GIESLER.